United States Patent
Lin et al.

(10) Patent No.: US 9,866,119 B2
(45) Date of Patent: Jan. 9, 2018

(54) DC-DC CONVERTER WITH PULL-UP AND PULL-DOWN CURRENTS BASED ON INDUCTOR CURRENT

(71) Applicant: MEDIATEK INC., Hsin-Chu (TW)

(72) Inventors: Shih-Mei Lin, Taipei (TW); Chien-Wei Kuan, Hsinchu County (TW); Chien-Lung Lee, Hsinchu (TW); Che-Hao Meng, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/201,626

(22) Filed: Jul. 5, 2016

(65) Prior Publication Data

US 2017/0222556 A1     Aug. 3, 2017

Related U.S. Application Data

(60) Provisional application No. 62/288,493, filed on Jan. 29, 2016.

(51) Int. Cl.

| | |
|---|---|
| *H02M 3/158* | (2006.01) |
| *H02M 1/08* | (2006.01) |
| *H02M 1/00* | (2006.01) |
| *G05F 1/618* | (2006.01) |
| *H02M 3/156* | (2006.01) |

(52) U.S. Cl.
CPC .............. *H02M 3/158* (2013.01); *H02M 1/08* (2013.01); *G05F 1/618* (2013.01); *H02M 2001/0009* (2013.01); *H02M 2001/0045* (2013.01); *H02M 2003/1566* (2013.01)

(58) Field of Classification Search
CPC . H02M 2001/0045; H02M 2001/0087; H02M 2003/1566; G05F 1/618
See application file for complete search history.

(56) References Cited

U.S. PATENT DOCUMENTS

| | | | |
|---|---|---|---|
| 7,812,578 B2 | 10/2010 | Sugahara et al. | |
| 7,982,445 B1 | 7/2011 | Xin-LeBlanc | |
| 8,461,815 B1 | 6/2013 | Ngo | |
| 8,587,268 B1 | 11/2013 | Huard | |
| 9,654,000 B2* | 5/2017 | Sandrez | ............... H02H 7/1213 |
| 2005/0052168 A1* | 3/2005 | Tazawa | ............... H02M 3/1584 |
| | | | 323/282 |
| 2007/0247124 A1 | 10/2007 | Mihashi | |
| 2008/0100274 A1 | 5/2008 | Hayakawa | |
| 2015/0188432 A1* | 7/2015 | Vannorsdel | ........... H02M 3/156 |
| | | | 323/271 |

* cited by examiner

*Primary Examiner* — Harry Behm
(74) *Attorney, Agent, or Firm* — Winston Hsu

(57) ABSTRACT

A DC-DC converter includes an inductor, a switch module, a pull-up circuit and a pull-down circuit. The inductor has a first node and a second node, and the second node is coupled to an output node of the DC-DC converter. The switch module is arranged for selectively connecting an input voltage or a ground voltage to the first node of the inductor according to a driving signal. The pull-up circuit is arranged for selectively providing a first current to the output node of the DC-DC converter. The pull-down circuit is arranged for selectively sinking a second current from the output node of the DC-DC converter. In addition, at least one of the first current provided by the pull-up circuit and the second current sunk by the pull-down circuit is determined based on an inductor current flowing through the inductor.

17 Claims, 3 Drawing Sheets

DC-DC CONVERTER WITH PULL-UP AND PULL-DOWN CURRENTS BASED ON INDUCTOR CURRENT

CROSS REFERENCE TO RELATED APPLICATIONS

This application claims the priority of U.S. Provisional Application No. 62/288,493, filed on Jan. 29, 2016, which is included herein by reference in its entirety.

BACKGROUND

When a DC-DC converter is used to convert an input voltage to a desired output voltage, a settling time (transition time) is preferred to be as short as possible. The settling time is related to an inductance of an inductor within the DC-DC converter, and the smaller inductance results in a shorter setting time. However, the smaller inductance may cause a large ripple on the output voltage. Therefore, the tradeoff between the settling time and the ripple becomes a problem to a designer.

Conventional art provides a converter having additional charging path to shorten the settling time, however, the response of the circuits is generally difficult to control due to the inappropriate setting of the current provided by this additional charging path.

SUMMARY

It is therefore an objective of the present invention to provide a DC-DC converter, which includes an additional charging path to shorten the setting time, and the current provided by the additional charging path is determined based on an inductor current flowing through the inductor within the DC-DC converter, to solve the above-mentioned problem.

In one embodiment of the present invention, a DC-DC converter for converting an input voltage to an output voltage at an output node is provided. The DC-DC converter comprises an inductor, a switch module, a pull-up circuit and a pull-down circuit. The inductor has a first node and a second node, wherein the second node is coupled to the output node of the DC-DC converter. The switch module is arranged for selectively connecting the input voltage or a ground voltage to the first node of the inductor according to a driving signal. The pull-up circuit is coupled to the output node of the DC-DC converter, and is arranged for selectively providing a first current to the output node of the DC-DC converter. The pull-down circuit is coupled to the output node of the DC-DC converter, and is arranged for selectively sinking a second current from the output node of the DC-DC converter. In addition, at least one of the first current provided by the pull-up circuit and the second current sunk by the pull-down circuit is determined based on an inductor current flowing through the inductor.

In another embodiment of the present invention, a method for controlling a DC-DC converter is provided, wherein the DC-DC converter comprises an inductor and a switch module, the inductor has a first node and a second node, the second node is coupled to an output node of the DC-DC converter, and the switch module selectively connects the input voltage or a ground voltage to the first node of the inductor according to a driving signal; and the method comprises: selectively providing a first current to the output node of the DC-DC converter; and selectively sinking a second current from the output node of the DC-DC converter; wherein at least one of the first current and the second current are determined based on an inductor current flowing through the inductor.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
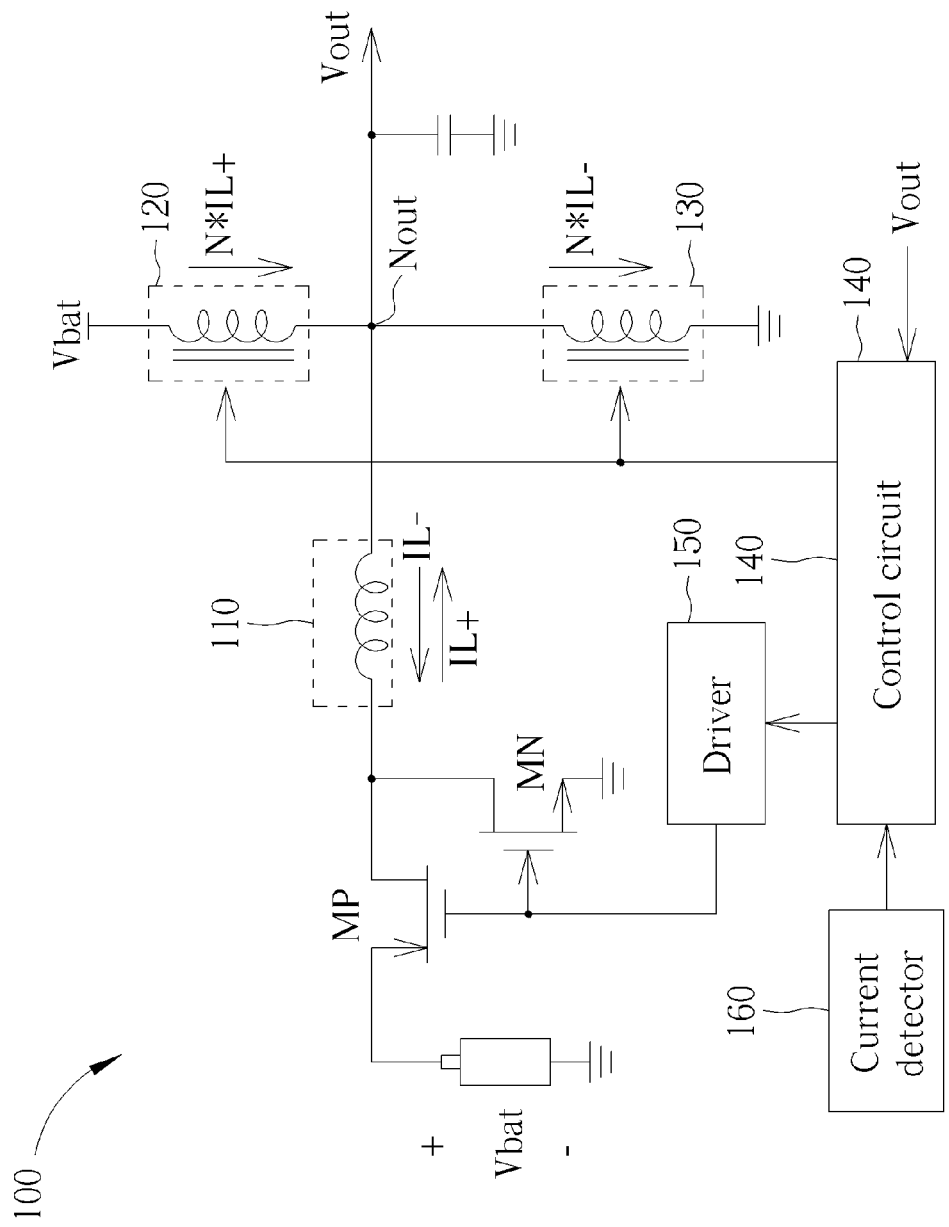
FIG. 1 is a diagram illustrating a DC-DC converter according to one embodiment of the present invention.

Please refer to FIG. 1, which is a diagram illustrating a DC-DC converter 100 according to one embodiment of the present invention. As shown in FIG. 1, the DC-DC converter 100 comprises a switch module comprising two switches MP and MN, an inductor 110, a pull-up circuit 120, a pull-down circuit 130, a control circuit 140, a driver 150 and a current detector 160. In this embodiment, the DC-DC converter 100 is used to receive an input voltage, such as a battery voltage Vbat, to generate an output voltage Vout at an output node.

In the operations of the DC-DC converter 100, the switch MP is arranged to selectively connect the input voltage Vbat to a first node of the inductor 110 according a driving signal outputted by the driver 150, and the switch MN is arranged to selectively connect a ground voltage to the first node of the inductor 110 according the driving signal outputted by the driver 150. In this embodiment, the driving signal outputted by the driver 150 is a pulse width modulation (PWM) signal, and a duty cycle of the driving signal is determined based on a current level of output voltage Vout and a desired level of the output voltage Vout. In detail, when the DC-DC converter 100 needs to raise the output voltage Vout, the control circuit 140 may control the driver 150 to adjust the duty cycle of the driving signal (in this embodiment, the duty cycle decreases), to increase the output voltage Vout. For example, when the driving signal is at a low level, the switch MN is off and the switch MP is on, and an inductor current IL+ (charging current) flows from the battery to the output node Nout to increase the output voltage Vout; and when the driving signal is at a high level, the switch MP is off and the switch MN is on, and an inductor current IL− (discharging current) flows from the output node Nout to the ground to decrease the output voltage Vout. By alternately enabling the switches MP and MN, the output node Nout is alternately charged and discharged to reach the desired output voltage.

In addition, to improve the settling time of the DC-DC converter 100 when the DC-DC converter 100 needs to raise the output voltage Vout, the pull-up circuit 120 is arranged to provide a current to the output node Nout when the battery charges the output node Nout, and the pull-down circuit 130 is arranged to sink a current from the output node Nout when the output node Nout is discharged. Particularly, the currents provided by the pull-up circuit 120 and the pull-down circuit 130 are a function of the inductor current of the inductor 110. In one embodiment, the currents provided by the pull-up circuit 120 and the pull-down circuit 130 have a positive relationship with the inductor current, for example, the current provided by the pull-up circuit 120 may equal to N*IL+, and the current provided by the pull-down circuit 130 may equal to N*IL−, where N can be any suitable values.

In detail, when the output voltage is set to be higher, the switch MP is turned on to make the inductor current IL+ (charging current) to flow from the battery to the output node Nout, the current detector 160 detects the inductor current IL+ to generate a detecting result, and the control circuit 140 controls the pull-up circuit 120 to provide the current (N*IL+) to the output node Nout, and at this time the pull-down circuit 130 is disabled. In addition, when the output voltage is set to be lower, the switch MN is turned on to make the inductor current IL− (discharging current) to flow from the output node Nout to the ground, the current detector 160 detects the inductor current IL− to generate a detecting result, and the control circuit 140 controls the pull-down circuit 130 to sink the current (N*IL−) from the output node Nout, and at this time the pull-up circuit 120 is disabled.

Figure 2:
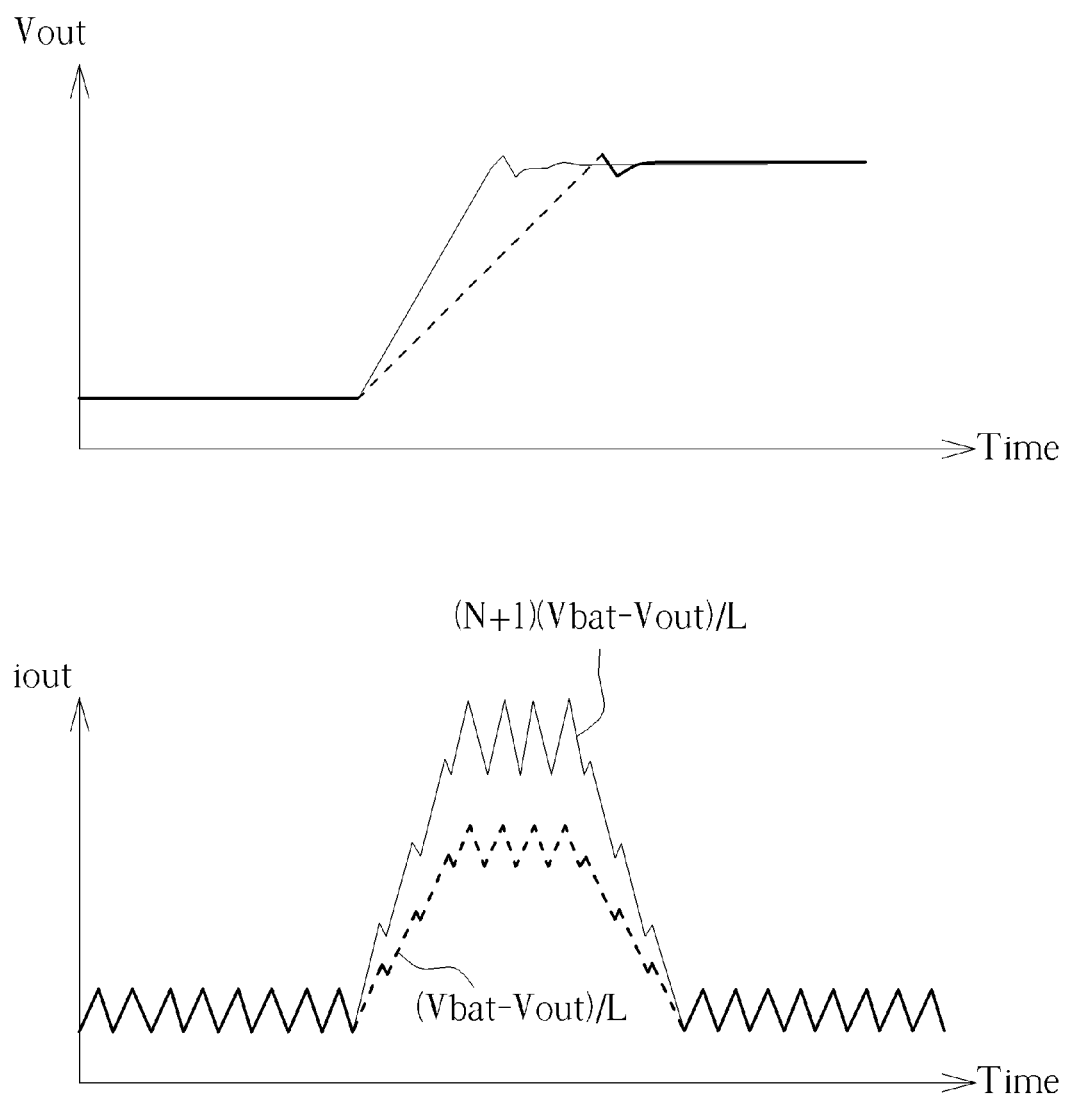
FIG. 2 shows timing diagrams of the output voltage and an output current of the DC-DC converter when DC-DC converter raises the output voltage.

FIG. 2 shows timing diagrams of the output voltage Vout and an output current iout of the DC-DC converter when DC-DC converter 100 raises the output voltage Vout. The solid line is for the DC-DC converter 100, and the dotted line is for the DC-DC converter without the pull-up circuit 120 and the pull-down circuit 130. As shown in FIG. 2, because of the use of the pull-up circuit 120 and the pull-down circuit 130, the charging current is equal to (Vbat−Vout)/(L*(N+1)), and the output voltage Vout can raise to the desired level faster (i.e. the settling time is shorten). In addition, because the current provided by the pull-up circuit 120 is a multiple of the inductor current IL+ (i.e. N*IL+), it is equivalent that the charging current is generated by a smaller inductor whose inductance is (L/(N+1)), where "L" is the inductance of the inductor 110. Therefore, the DC-DC converter 100 can have the shorter settling time without using the inductor having smaller inductance actually, thereby the ripple issue can be alleviated.

Furthermore, because the current provided by the pull-up circuit 120 is a function of the inductor current IL+, the charging current (i.e. the output current iout) can be regarded as the function of the inductor current IL+. Therefore, the response of the circuits can be controlled easily, and the loop control can be simplified.

Figure 3:
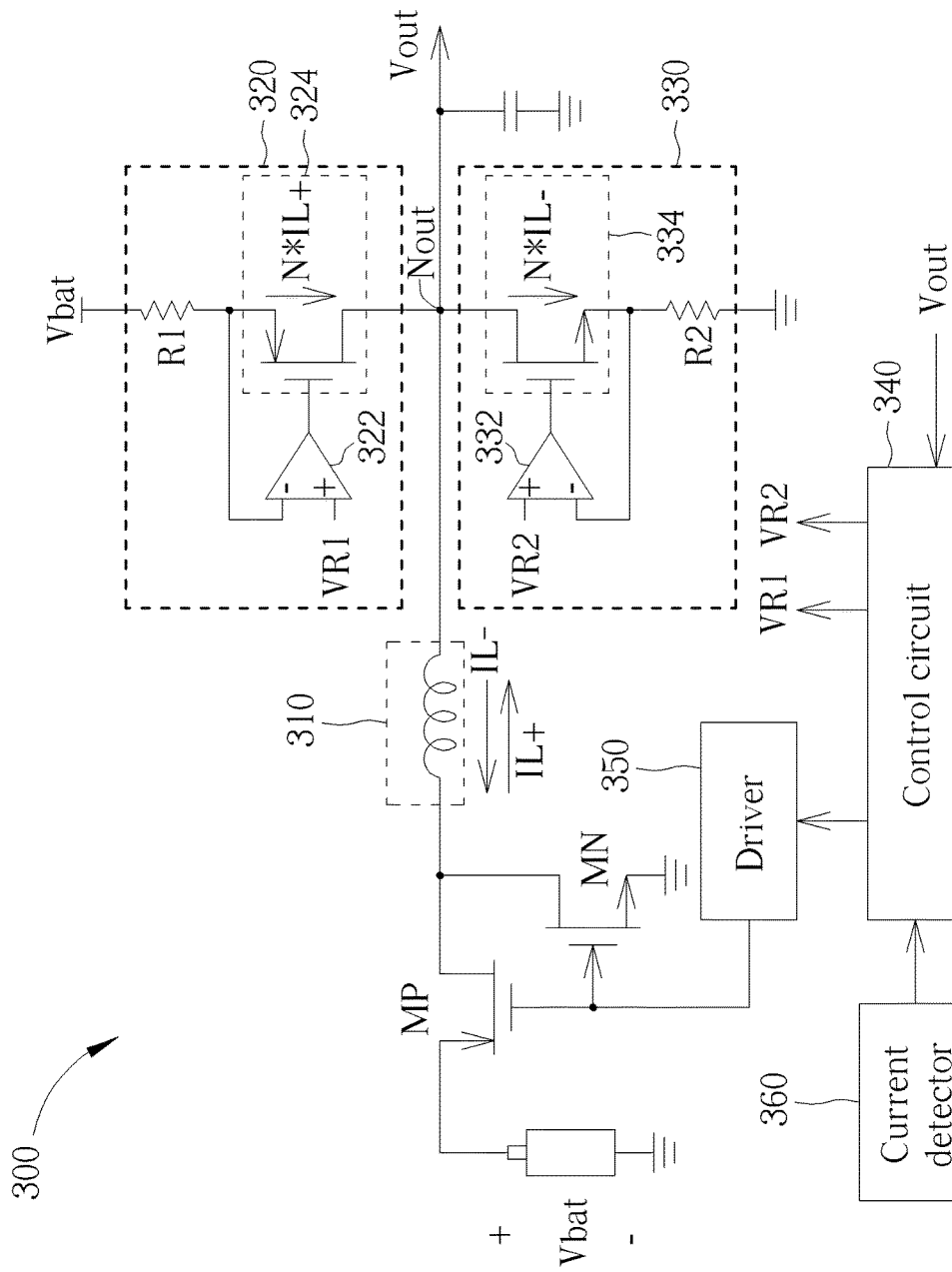
FIG. 3 is a diagram illustrating a DC-DC converter according to another embodiment of the present invention.

Please refer to FIG. 3, which is a diagram illustrating a DC-DC converter 300 according to another embodiment of the present invention. As shown in FIG. 3, the DC-DC converter 300 comprises a switch module comprising two switches MP and MN, an inductor 310, a pull-up circuit 320, a pull-down circuit 330, a control circuit 340, a driver 350 and a current detector 360. In this embodiment, the DC-DC converter 300 is used to receive an input voltage, such as a battery voltage Vbat, to generate an output voltage Vout at an output node.

In this embodiment, the pull-up circuit 320 comprises an operational amplifier 322, a transistor 324 and a resistor R1, where a negative input node of the operational amplifier 322 is coupled to a source electrode of the transistor 324, and a positive input node of the operational amplifier 322 receives a first reference voltage VR1 outputted by the control circuit 340. The pull-down circuit 330 comprises an operational amplifier 332, a transistor 334 and a resistor R2, where a negative input node of the operational amplifier 332 is coupled to a source electrode of the transistor 334, and a positive input node of the operational amplifier 332 receives a second reference voltage VR2 outputted by the control circuit 340.

In the operations of the DC-DC converter 300, the switch MP is arranged to selectively connect the input voltage Vbat to a first node of the inductor 310 according a driving signal outputted by the driver 350, and the switch MN is arranged to selectively connect a ground voltage to the first node of the inductor 310 according the driving signal outputted by the driver 350. In this embodiment, the driving signal outputted by the driver 350 is a pulse width modulation (PWM) signal, and a duty cycle of the driving signal is determined based on a current level of output voltage Vout and a desired level of the output voltage Vout. In detail, when the DC-DC converter 300 needs to raise the output voltage Vout, the control circuit 340 may control the driver 350 to adjust the duty cycle of the driving signal (in this embodiment, the duty cycle decreases), to increase the output voltage Vout. For example, when the driving signal is at a low level, the switch MN is off and the switch MP is on, and an inductor current IL+ (charging current) flows from the battery to the output node Nout to increase the output voltage Vout; and when the driving signal is at a high level, the switch MP is off and the switch MN is on, and an inductor current IL− (discharging current) flows from the output node Nout to the ground to decrease the output voltage Vout. By alternately enabling the switches MP and MN, the output node Nout will reach the desired output voltage.

In addition, to improve the settling time of the DC-DC converter 300 when the DC-DC converter 300 needs to raise the output voltage Vout, the pull-up circuit 320 is arranged to provide a current to the output node Nout when the battery charges the output node Nout, and the pull-down circuit 330 is arranged to sink a current from the output node Nout when the output node Nout is discharged. Particularly, the currents provided by the pull-up circuit 320 and the pull-down circuit 330 are a function of the inductor current of the inductor 310. In one embodiment, the currents provided by the pull-up circuit 320 and the pull-down circuit 330 have a positive relationship with the inductor current, for example, the current provided by the pull-up circuit 320 may equal to N*IL+, and the current provided by the pull-down circuit 330 may equal to N*IL−, where N can be any suitable values.

In detail, when the inductor current IL+ is increased to flow from the battery to the output node Nout, the current detector 360 detects the inductor current IL+ to generate a detecting result. For example, without a limitation of the present invention, the current detector 360 may use a current mirror to sense the current flowing through the switch MP to generate the detecting result. Then, the control circuit 340 generates the first reference voltage VR1 to the positive input node of the operational amplifier 322 according to the detecting result. In this embodiment, the greater the inductor current, the control circuit 340 generates the lower first reference signal VR1 to the positive input node of the operational amplifier 322, to make the current provided by the pull-up circuit 320 always substantially equal to (N*IL+). In addition, when the inductor current IL is decreased beneath zero to flow from the output node Nout to the ground, the current detector 360 detects the inductor current IL− to generate a detecting result. For example, without a limitation of the present invention, the current detector 360 may use a current mirror to sense the current flowing through the switch MN to generate the detecting result. Then, the control circuit 340 generates the second reference voltage VR2 to the positive input node of the operational amplifier 332 according to the detecting result. In this embodiment, the greater the inductor current, the control circuit 340 generates the greater second reference signal VR2 to the positive input node of the operational amplifier 332, to make the current provided by the pull-down circuit 330 always substantially equal to (N*IL−).

Briefly summarized, in the DC-DC converter of the present invention, additional charging paths are arranged to shorten the setting time, and the currents provided by the additional charging current are a function of the inductor current. Therefore, the DC-DC converter can have the shorter settling time without using the inductor having smaller inductance actually to alleviate the ripple issue, and the response of the circuits can be controlled easily, and the loop control can be simplified.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A DC-DC converter for converting an input voltage to an output voltage at an output node, comprising:
   an inductor having a first node and a second node, wherein the second node is coupled to the output node of the DC-DC converter;
   a switch module, for selectively connecting the input voltage or a ground voltage to the first node of the inductor according to a driving signal;
   a pull-up circuit, coupled to the output node of the DC-DC converter, for selectively providing a first current to the output node of the DC-DC converter; and
   a pull-down circuit, coupled to the output node of the DC-DC converter, for selectively sinking a second current from the output node of the DC-DC converter;
   wherein at least one of the first current provided by the pull-up circuit and the second current sunk by the pull-down circuit is determined based on an inductor current flowing through the inductor, the first current or the second current has a positive relationship with the inductor current, and the first current or the second current is a multiple of the inductor current.

2. The DC-DC converter of claim 1, wherein the first current and the second current do not flow through the inductor.

3. The DC-DC converter of claim 1, wherein the first current or the second current is a function of the inductor current.

4. The DC-DC converter of claim 1, wherein when the switch module couples the input voltage to the first node of the inductor, the pull-up circuit provides the first current to the output node of the DC-DC converter according to the inductor current, and the pull-down circuit is disabled; and when the switch module couples the ground voltage to the first node of the inductor, the pull-down circuit sinks the second current from the output node of the DC-DC converter according to the inductor current, and the pull-up circuit is disabled.

5. The DC-DC converter of claim 1, further comprising:
   a current detector, for detecting the inductor current to generate a detecting result; and
   a control circuit, for generating a first control signal to selectively provide the first current to the output node of the DC-DC converter according to the detecting result, and generating a second control signal to selectively sink the second current from the output node of the DC-DC converter according to the detecting result.

6. A DC-DC converter for converting an input voltage to an output voltage at an output node, comprising:
   an inductor having a first node and a second node, wherein the second node is coupled to the output node of the DC-DC converter;
   a switch module, for selectively connecting the input voltage or a ground voltage to the first node of the inductor according to a driving signal;
   a pull-up circuit, coupled to the output node of the DC-DC converter, for selectively providing a first current to the output node of the DC-DC converter; and
   a pull-down circuit, coupled to the output node of the DC-DC converter, for selectively sinking a second current from the output node of the DC-DC converter;
   wherein at least one of the first current provided by the pull-up circuit and the second current sunk by the pull-down circuit is determined based on an inductor current flowing through the inductor;
   wherein the pull-up circuit comprises:
   a first transistor comprising a gate electrode, a first electrode and a second electrode, where the first electrode is coupled to a supply voltage, and the second electrode is coupled to the output node of the DC-DC converter; and
   a first operational amplifier, wherein a first input terminal of the first operational amplifier is coupled to the first electrode of the first transistor, a second input terminal of the first operational amplifier receives a first reference signal, and an output terminal of the first operational amplifier is coupled to the gate electrode of the first transistor, and the first reference signal is generated based on the inductor current.

7. The DC-DC converter of claim 6, further comprising:
   a current detector, for detecting the inductor current to generate a detecting result; and
   a control circuit, for generating the first reference signal according to the detecting result.

8. The DC-DC converter of claim 7, wherein when the inductor current increases, the control circuit generates the lower first reference signal to the second input terminal of the first operational amplifier.

9. The DC-DC converter of claim 6, wherein the pull-down circuit comprises:
   a second transistor comprising a gate electrode, a first electrode and a second electrode, where the first electrode is coupled to a ground voltage, and the second electrode is coupled to the output node of the DC-DC converter; and
   a second operational amplifier, wherein a first input terminal of the second operational amplifier is coupled to the first electrode of the second transistor, a second input terminal of the second operational amplifier receives a second reference signal, and an output terminal of the second operational amplifier is coupled to the gate electrode of the second transistor, and the second reference signal is generated based on the inductor current.

10. The DC-DC converter of claim 9, further comprising:
a current detector, for detecting the inductor current to generate a detecting result; and
a control circuit, for generating the first reference signal and the second reference signal according to the detecting result.

11. The DC-DC converter of claim 10, wherein when the switch module connects the ground voltage to the first node of the inductor, the greater the inductor current, the control circuit generates the greater second reference signal to the second input terminal of the second operational amplifier.

12. The DC-DC converter of claim 10, wherein when the switch module connects the input voltage to the first node of the inductor, the greater the inductor current, the control circuit generates the lower first reference signal to the second input terminal of the first operational amplifier.

13. A method for controlling a DC-DC converter, wherein the DC-DC converter comprises an inductor and a switch module, the inductor has a first node and a second node, the second node is coupled to an output node of the DC-DC converter, and the switch module selectively connects the input voltage or a ground voltage to the first node of the inductor according to a driving signal; and the method comprises:
selectively providing a first current to the output node of the DC-DC converter; and
selectively sinking a second current from the output node of the DC-DC converter;
wherein at least one of the first current and the second current are determined based on an inductor current flowing through the inductor, the first current or the second current has a positive relationship with the inductor current, and the first current or the second current is a multiple of the inductor current.

14. The method of claim 13, wherein the first current and the second current do not flow through the inductor.

15. The method of claim 13, wherein the first current or the second current is a function of the inductor current.

16. The method converter of claim 13, wherein the step of the selectively providing the first current to the output node of the DC-DC converter, and the step of selectively sinking the second current from the output node of the DC-DC converter comprises:
when the switch module couples the input voltage to the first node of the inductor, providing the first current to the output node of the DC-DC converter according to the inductor current, and not sinking the second current from the output node of the DC-DC converter; and
when the switch module couples the ground voltage to the first node of the inductor, sinking the second current from the output node of the DC-DC converter according to the inductor current, and not providing the first current to the output node of the DC-DC converter.

17. The method of claim 13, further comprising:
detecting the inductor current to generate a detecting result;
determining the first current according to the detecting result; and
determining the second current according to the detecting result.

* * * * *